POLARIZING COLOR FILTER FOR USE IN COLOR TELEVISION SYSTEMS

Filed Aug. 31, 1965

INVENTOR.
PETER LAPUT
BY Peter Laput

United States Patent Office 3,544,193
Patented Dec. 1, 1970

3,544,193
POLARIZING COLOR FILTER FOR USE IN COLOR TELEVISION SYSTEMS

Peter Laput, 32—29 43rd St., Long Island City, N.Y. 11103

Filed Aug. 31, 1965, Ser. No. 484,020
Int. Cl. G02f *1/40*
U.S. Cl. 350—150 5 Claims

ABSTRACT OF THE DISCLOSURE

A color filter with a multiplicity of small discrete areas of three respective colors is provided for use with a color television screen. Each discrete color area provides polarization of light different from each other. The filter is used in operation with a polarizer and a variable electro-optical cell.

This invention relates to color television and more particularly to an electronic and optical system employing a standard black and white cathode ray tube with a multicolor optical filter with provision for making said filter change color in sequence.

It is an object of the present invention to provide a system, when used with a color television chassis to fully utilize the total beam of the cathode ray tube to create useful light on the tube face as in present monochrome receivers, without wasting current striking shadow masks.

Another object of the present invention is to provide for the use of simpler circuitry in color television receivers obviating the need for convergence circuitry, demagnetizing circuitry, high voltage regulating circuitry, or the generation of beam deflection voltages other than those necessary for conventional black and white television.

Another object of the present invention is to provide a color television display system unaffected by differences in aging that are present in a system using multiple guns or phosphor coatings.

Still a further object of the present invention is to provide a color television receiver which can be produced, packaged, and sold in large quantities at a comparatively low cost and which can be conveniently utilized wherever needed.

Still additional objects, benefits, and advantages of this invention wil become evident from a study of the following detailed description taken in conjunction with the accompanying drawing, in which.

Figure 1:
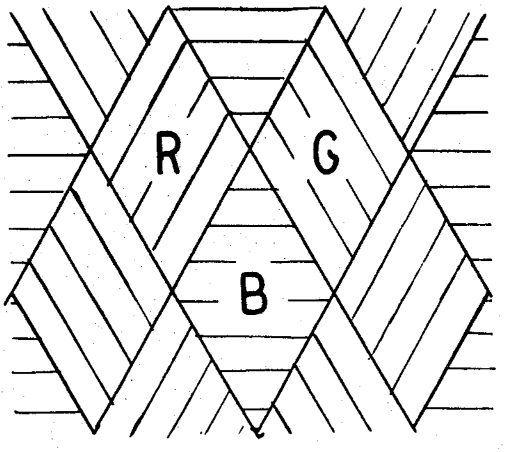
FIG. 1 is an enlarged sectional view of the multicolor optical filter, when used with a mechanical system.

Referring now specifically to the drawing, a multicolor optical filter, FIG. 1, made in accordance with the present invention is shown to include a pattern of red, green, and blue alternating transparent dye dots. The pattern shown employs rhomboid dots but the pattern could also be made up of alternating squares in a checkerboard pattern or either vertical or horizontal alternating red, green, and blue stripes. For this example the three primary colors chosen were red, green, and blue, and three of the dots were identified with the letters R, G, and B.

Three other primaries could have been selected, namely, cyan, magenta, and yellow, so that we can refer to the three color areas as A, B, and C without necessarily specifying color.

If the pattern selected is stripes they should have a width no greater than .01 inch, if the pattern selected is dots, the longest diagonal of each dot should be no greater than .01 inch.

In an overlay or upon the opposite surface of the filter three different optical polarizing coatings are superimposed, A′, B′, and C′ in similar pattern. The polarizing coatings are congruent with their respective colors, and differ from each other in that their planes of polarization are 60 degrees apart.

The hatching used to identify the respective dots in FIG. 1 also serves to show the plane of polarization for each color.

This filter is intended for use with a mechanical system.

Figure 2:
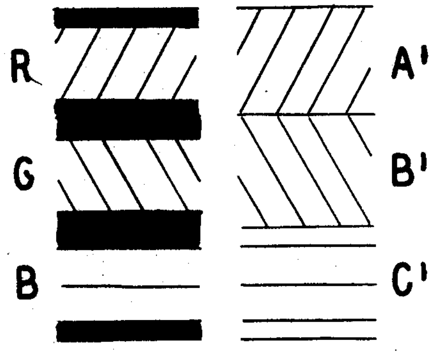
FIG. 2 is an enlarged sectional view of the multicolor optical filter and secondary polarized coating, when used with the modified Kerr cell.

FIG. 2 is an enlarged view of a section of another embodiment of the multicolor optical filter intended for use with an associated modified Kerr cell for an all electronic system. The polarized color stripe pattern shown at the left is applied to one surface of the cell. The polarized coating secondary pattern identified as stripes A′, B′, and C′ may be superimposed on the opposite surface of the cell in proper registration with the stripes corresponding to one of the colors. Finally, opaque stripes shown in black, ⅓ the thickness of the regular stripes are applied at the junction of colors to prevent parallax.

Figure 3:
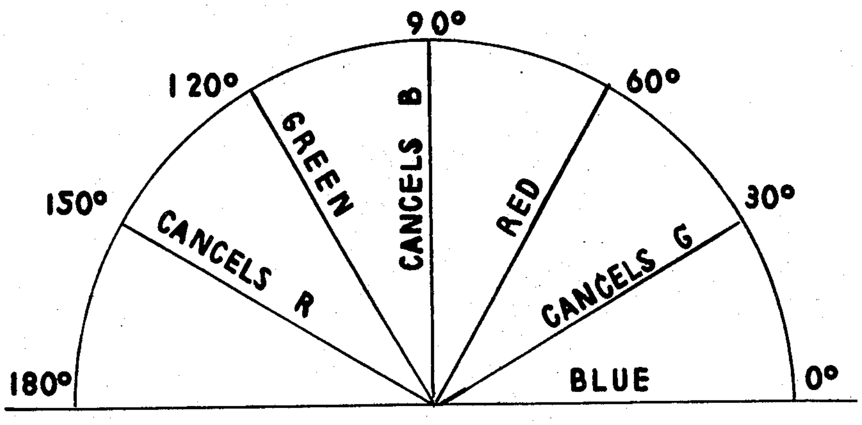
FIG. 3 is a vector diagram showing the relationship of the planes of polarization.

The planes of polarization are also shown in the vector diagram, FIG. 3. Conventional electronics practice is used to show the reference point or zero degrees at the right. In this example the blue areas of the filter are polarized along the 0–180 degree axis. If another polarizing filter were placed over the multicolor filter with it's plane of polarization at 90 degrees, the blue areas would become cross polarized or opaque. The blue ares of the filter would become cancelled, leaving the red and green areas to transmit light. This light is somewhat attenuated as the plane of each color is rotated 30 degrees from the cross polarizing filter, but the degree of attenuation is the same for each. At normal viewing distance the red and green areas transmitting light produce yellow.

Similarly, red could be cancelled by being cross polarized at 150 degrees, the remaining green and blue giving a cyan output, and green could be cancelled at 30 degrees, for an output of magenta. In the alternate system, removing cyan produces red, removing magenta produces green, and removing yellow produces blue. In either case if no color is cancelled the filter appears a neutral gray at normal viewing distance, transmitting white light.

Figure 4:
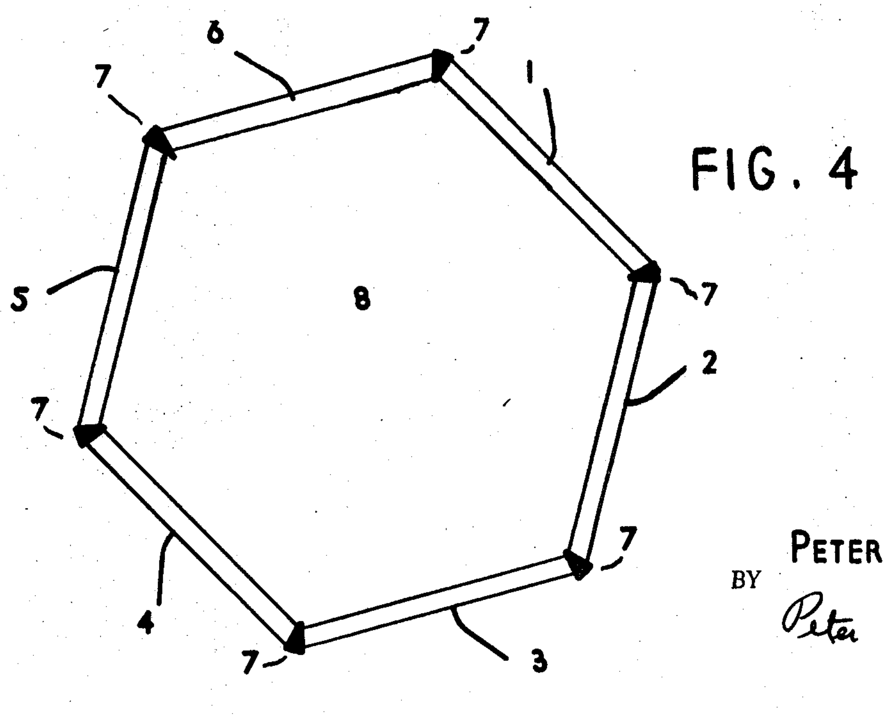
FIG. 4 is a plan view of the associated modified Kerr cell.

The modified Kerr cell in FIG. 4 to serve as part of a cross polarizing filter consists of two hexagon shaped pieces of glass or plastic 8, cemented to six dielectric coated, metal conducting rods 1 thru 6, rectangular in cross section, arranged to form the frame of said cell. Insulators 7, act as separators at the corners of the frame. Electrical conducting leads are attached to each rod to enable each rod to become a plate or electrode. The whole is filled with a polarizing retarder liquid such as nitrobenzine and hermetically sealed. The thickness of the cell, with modern technology, may be kept almost to a thickness comparable to present day safety face plates, the diameter of the cell will be dependent on the size of the cathode ray tube it is to be used with. The multicolor optical filter is applied to that surface of the modified Kerr cell that is to be adjacent to the cathode ray tube face. The secondary polarizing screen pattern faces the viewer.

Tne operation of this system will now be readily understood. A color television receiver is equipped with a black and white cathode ray tube. In the electronic system, the modified Kerr cell, with coatings, is applied over the face of the tube.

The color receiver must have the circuitry necessary to seperate and demodulate the color information present in the F.C.C. approved N.T.S.C. color signal, with a separate red—Y output, green—Y output, and blue—Y output. The Y amplifier may be used to feed the cathode of the cathode ray tube, and the color outputs to feed the grid, in desired phase, where matrixing will take place in the tube itself.

The present invention is designed to accept program material transmitted in the simultaneous color method and convert it to a field sequential display. It has many advantages over the now well known method of adding color circuitry and a color wheel to convert black and white sets to color, and indeed a mechanical method can be used, the advantage being that the cross polarization is accomplished by a single rim driven polarizing filter, just large enough to cover the screen, and used with the polarized multicolor filter, alone.

The transmitted vertical synchronizing pulses are used to trigger a flip flop string so that the grids of the red, green, and blue outputs are cut off in sequence on successive vertical fields, at the same time opposing plates of the modified Kerr cell such as 1 and 4, 2 and 5, 3 and 6 are switched to a difference of potential to cancel the corresponding colors. The electrostatic lines of force between opposing plates have to form an angle of 45 degrees to the plane of polarization desired to be acted upon. When energized they shift the plane of polarization 90 degrees so that the emerging light is cross polarized by the polarized coating on the outer surface of the cell. Light rays emerging from the other two planes are not at 45 degrees to the electrostatic field and pass thru with little rotation.

Furthermore, the size of the cell in relation to the tube face can be reduced by a more complex method of switching so that three adjacent plates are combined at a time, to energize the entire cell in a given direction. In the example where plates 1 and 4 are active, plates 2 and 6 can be connected in parallel with plate 1, and 3 and 5 connected with plate 4. There are innumerable ways to accomplish such switching, by employing gas and vacuum tubes, and silicon controlled rectifiers.

In this example, three successive color fields were arrived at by removing one color at a time. The red information was cut off at the same time red was cancelled in the filter. This gave us green and blue information and a cyan screen. The removal of the green gave us red and blue information and a magenta screen, and the removal of blue gave us red and green information and a yellow screen. The more conventional method of display would work by using a cyan, magenta, and yellow filter.

Cancelling the yellow portion of the filter would give us a blue screen during hich time only the blue output would be permitted to conduct. Cancelling the magenta portion would produce a green screen during which time only the green output would conduct, and cancelling the cyan portion of the filter would produce a red screen during which time the red output would conduct. The time lag of the modified Kerr cell liquid would occur during the vertical blanking period.

A field sequential system having 20 complete color fields per second causes flicker to be apparent to some individuals. An additional feature of this system is the elimination of flicker. This is accomplished because each color dot or stripe stays lit for two successive fields. The red dot for instance, will be lit during the creation of magenta field and also during the creation of the yellow field. For one complete color field cyan, magenta, and yellow will be produced once, each for $\frac{1}{60}$ of a second, but during this time, the red, green, and blue areas of the screen would have each been lit twice.

While this invention has been described with particular reference to the construction shown in the drawing and while various changes may be made in the detail construction, it shall be understood that such changes shall be within the spirit and scope of the present invention as defined by the appended claims.

Having thus completely and fully described the invention, what is now claimed as new and desired to be protected by Letters Patent of the United States is:

1. For use with a cathode ray tube, a color filter, comprising a multiplicity of small discrete areas of three respective primary colors arranged in a predetermined repetitive, non-overlapping pattern on a surface of said filter, said areas having predetermined planes of polarization which differ for each color, the individual areas being arranged such that any selected area of the filter corresponding to one of said small areas only transmits a band of optical frequencies corresponding to the color of said one small area, and polarizing means for successively transmitting optical wavelengths corresponding to two of said colors through any such area of said filter, wherein said polarizing means comprises an electro-optical polarization rotator, said multiplicity of discrete color areas being arranged at one side of said rotator, with three groups of discrete polarized areas being arranged at the other side of said rotator, the discrete polarized areas of each group being similarly polarized, with the areas of each group overlying at least in part the discrete areas corresponding to one of said colors and being similarly polarized, said electro-optical polarization rotator being controllable to rotate the plane of polarization of light passing through said filter so that such plane is perpendicular to successive ones of the planes of polarization of said discrete color areas.

2. A color filter according to claim 1, wherein said polarizing means successively blocks the passage of optical wavelengths corresponding to one of said colors while transmitting the optical wavelengths corresponding to the two remaining colors.

3. A color filter according to claim 2, wherein said discrete areas comprise narrow lines.

4. A color filter according to claim 2, wherein said discrete areas comprise dots.

5. A color filter according to claim 3, including opaque lines on one of said surfaces between adjacent ones of said narrow lines.

References Cited

UNITED STATES PATENTS

| | | | |
|---|---|---|---|
| 2,493,200 | 1/1950 | Land | 350—148 |
| 2,514,043 | 7/1950 | Engstrom et al. | 350—148 X |
| 2,586,635 | 2/1952 | Fernsler | 350—148 X |
| 2,720,553 | 10/1955 | Toulon | 350—148 X |
| 2,753,763 | 7/1956 | Haines | 350—148 |
| 2,834,254 | 5/1958 | Sage | 350—148 |

DAVID SCHONBERG, Primary Examiner

P. R. MILLER, Assistant Examiner

U.S. Cl. X.R.

178—7.86; 350—148, 158, 159